Figure 1:
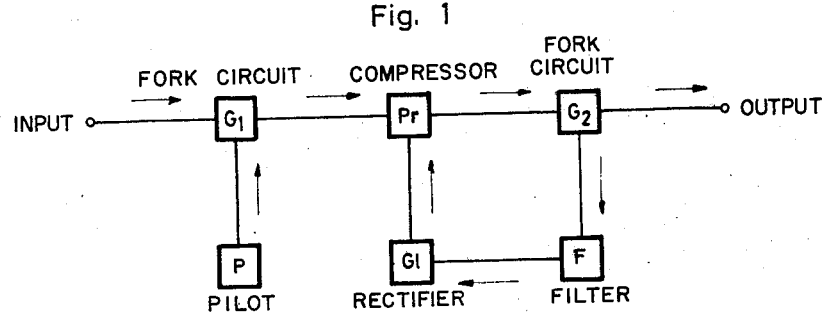

United States Patent Office 2,986,712
Patented May 30, 1961

2,986,712

COMPANDER SYSTEM FOR TRANSMITTING INTELLIGENCE

Hans Hochrath, Munich, Germany, assignor to Siemens & Halske Aktiengesellschaft Berlin and Munich, a corporation of Germany Filed Sept. 9, 1959, Ser. No. 838,994

Claims priority, application Germany Sept. 17, 1958

7 Claims. (Cl. 333—14)

This invention is concerned with a compander system for transmitting intelligence, comprising a compressor to which are supplied the signals to be transmitted and also a pilot with constant amplitude, such pilot, after passing through the compressor, being transmitted to the receiver side together with the signals, and means at the receiver side for equalizing or compensating the dynamic compression effected by the compressor at the transmitting side.

In systems for transmitting speech and music, there are often employed companders the regulation or control of which depends upon the enveloping curve of the matter that is being transmitted. Such companders may be controlled either according to program, that is, they may consist of a program controlled compressor and a likewise program controlled expander, or they may be controlled by a pilot, that is, they may consist of a program controlled compressor and a pilot controlled expander.

Program controlled companders have the disadvantage that faults occurring in the transmission system extending between the compressor and the expander affect transmission so that the matter appearing at the output of the compressor does not conform to the enveloping curve of the matter at the input of the expander, thus causing dynamic distortions as well as increasing appearance of inadmissible difference sounds.

While a pilot controlled compander avoids inadmissible dynamic distortions, there result other essential disadvantages, for example, increased formation of difference sounds and in increasing measure extended oscillation phenomena which are in many cases inadmissible. The transmission of the pilot requires moreover a wide frequency band corresponding to the regulation speed.

The invention proposes a compander transmission system comprising at the receiver side a generally known pilot controlled regulator operating as means for compensating the dynamic compression effected by the compressor at the transmitter side, and a generally known program controlled dynamic regulator disposed in the transmission path, as seen in the direction of transmission, after the regulator member of the pilot controlled regulator but ahead of the point at which the pilot used for the control of the pilot controlled regulator is branched off from transmitted matter.

The above noted arrangement, as compared with the program controlled compander, results in the advantage that the program level at the input of the program controlled expander corresponds to the program level at the output of the compressor even in the presence of damping fluctuations of the transmission system extending between the compressor and expander. The particular arrangement of the program controlled expander, between the pilot branch-off point and the regulation member of the pilot controlled expander, effects at the same time elimination regulation of errors occurring in the program controlled expander. As a further advantage, the difference sound formation is as a result of the cooperation of both these features smaller than in any prior compander system, providing for a dynamic at the output of the compander system which is exactly proportional to that at the input thereof. Still another advantage resides in requirements with respect to the pilot channel width which are lower than in previously known pilot compander systems.

In accordance with a further feature of the invention, there are provided, in the regulation paths of the program controlled compander parts, uniformly similar frequency dependent damping members, especially filters. For example, pilot blocks may be inserted in these paths. The compressor and the program controlled expander may likewise be frequency dependent. It is moreover advantageous to derive from the voltage level and frequency of the pilot as well as from the regulation voltage in the regulation path of the program controlled expander, criteria for the automatic supervision of the transmission quality.

Figure 2:
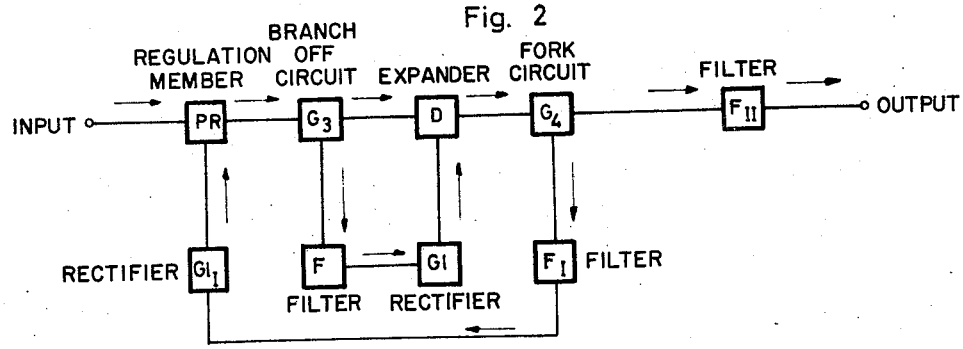

The invention will now be described with reference to the accompanying drawings, wherein Fig. 1 shows a compressor arrangement; and Fig. 2 shows an expander arrangement.

Referring now to Fig. 1, $G_1$ indicates a fork circuit over which the input signal and a pilot P with constant frequency and constant amplitude are conducted to the input of the compressor $Pr$. The control voltage required for the regulation of the compressor $Pr$ is obtained from the output signal of such compressor by way of another fork circuit $G_2$ and filter F which blocks the pilot frequency, and thence by way of a rectifier circuit G1, the latter controlling the compressor $Pr$ with a predetermined time constant. Accordingly, the amplitude of the signal as well as of the pilot are compressed depending upon the voltage level output.

The frequency mixture appearing at the output of the compressor arrangement is conducted over a message transmission system terminating at the receiver side in an expander circuit according to Fig. 2. The pilot and the signal are by way of a first regulation member PR and a branch-off circuit $G_3$ extended to an expander D, the control of which is effected in similar manner as the compressor control (Fig. 1) by way of a filter F and rectifier circuit G1. The pilot appearing at the output of the expander D, which now contains in its amplitude a criterion for the damping of the transmission path and/or for erroneous expansion, is branched off in the fork circuit $G_4$ and conducted to the filter $F_I$ in which the signal is blocked out. The amplitude of the pilot which is rectified in the rectifier circuit $G1_I$ controls the previously noted regulation member PR at the input of the illustrated circuit; accordingly, the pilot is, at the branch-off point of the fork $G_4$ following the expander D, constant and at the correct voltage level. This means, moreover, that the signal which is at this point at the correct voltage level can be branched off without dynamic distortions. It is merely necessary to block off the pilot frequency, which is effected by means of filter $F_{II}$.

Changes may be made within the scope and spirit of the appended claims which define what is believed to be new and desired to have protected by Letters Patent.

I claim:

1. A signal transmission system comprising a compressor at the transmitter side, means for conducting to said compressor the signals to be transmitted and also a pilot, means for transmitting said signals and said pilot, after passage thereof through said compressor, to the receiver side of the system, means at the receiver side for compensating the dynamic compression effected by the compressor at the transmitter side, said compensating means comprising a pilot controlled regulator and a program controlled dynamic regulator which is as seen in the direction of transmission disposed in the transmission path following the regulation member of the pilot controlled regulator but ahead of the point at which the pilot employed for the pilot controlled regulator is branched off from the transmitted signals.

2. A transmission system according to claim 1, comprising uniformly similar frequency dependent damping members and especially filters, disposed in the regulation paths of the program controlled compander parts.

3. A transmission system according to claim 2, wherein the compressor and likewise the program controlled expander are frequency dependent.

4. A transmission system according to claim 2, comprising means at the receiver side for deriving, from the voltage level and the frequency of the pilot as well as from the control voltage of the program controlled expander, criteria for the automatic supervision of the transmission quality.

5. A transmission system according to claim 1, wherein the compressor and likewise the program controlled expander are frequency dependent.

6. A transmission system according to claim 5, comprising means at the receiver side for deriving, from the voltage level and the frequency of the pilot as well as from the control voltage of the program controlled expander, criteria for the automatic supervision of the transmission quality.

7. A transmission system according to claim 1, comprising means at the receiver side for deriving, from the voltage level and the frequency of the pilot as well as from the control voltage of the program controlled expander, criteria for the automatic supervision of the transmission quality.

References Cited in the file of this patent
UNITED STATES PATENTS

| | | |
|---|---|---|
| 2,102,138 | Strieby | Dec. 14, 1937 |
| 2,358,045 | Barney | Sept. 12, 1944 |